Sept. 2, 1941.  A. HANSEN, JR  2,254,698
MAGNETIC SYSTEM
Filed Oct. 4, 1940
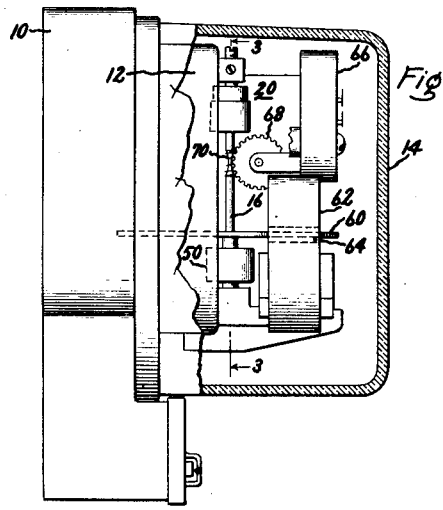
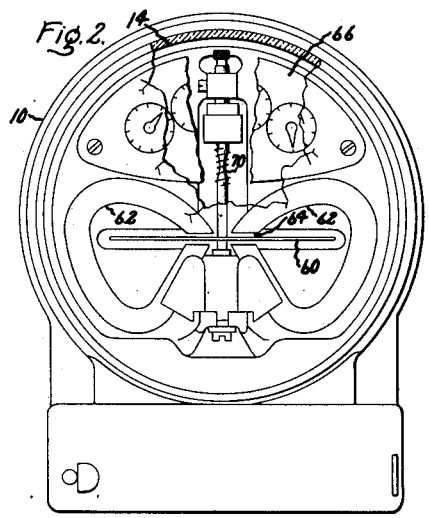
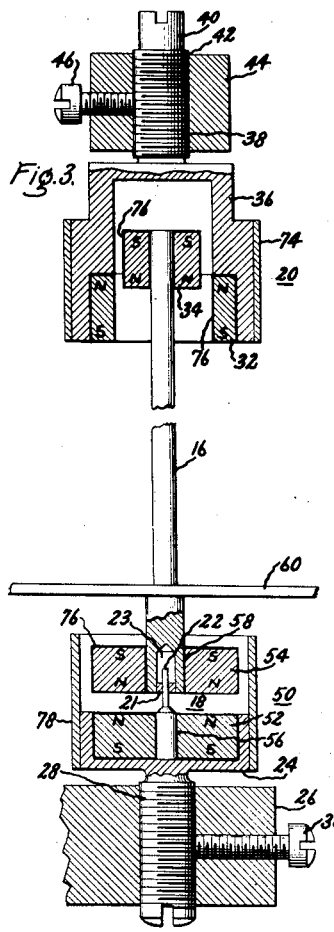
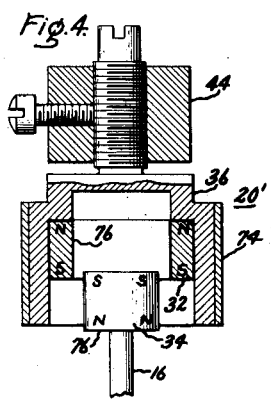
Inventor:
Albert Hansen Jr.,
by Harry E. Dunham
His Attorney.

Patented Sept. 2, 1941

2,254,698

UNITED STATES PATENT OFFICE 2,254,698

MAGNETIC SYSTEM

Albert Hansen, Jr., Nahant, Mass., assignor to General Electric Company, a corporation of New York Application October 4, 1940, Serial No. 359,733

11 Claims. (Cl. 171—34)

This invention relates to a magnetic system for reducing to a minimum the friction on a rotatable element, and though having other and broader fields of application the invention is particularly useful for magnetically guiding and suspending the movable element in an instrument or meter.

In connection with the operation of measuring devices, such as time-keeping elements or electrical measuring instruments and meters, it is highly important that all causes of inaccuracy be reduced to as low a value as possible. For example, in the operation of electrical integrating meters, where a shaft is rotated, friction enters in due to both ends and side thrust, thereby causing a retarding torque, and some means should be used for reducing this friction to a minimum. In the conventional watthour meter the end thrust bearing at the bottom of the movable spindle which supports the weight is usually a sapphire jewel which is subject to being broken or roughened in a short time by the action of the spindle point. This roughening results primarily in causing the meter to have a different operating characteristic with the result that it runs slow on some loads and particularly so when the meter is operating at low loads. Friction also enters due to lateral thrusts. When such conditions are present it means that the central station may be supplying energy at a monetary loss in view of the fact that a large portion of the meters are in service several hours per day on the low load end of their characteristics. It is accordingly an object of my invention to provide an improved magnetic system for reducing the friction acting on a rotary element.

It is another object of my invention to provide a new and improved magnetic system for supporting and guiding a movable element or rotatable shaft such, for example, as the spindle and rotary disk of a watthour meter.

It is still another object of my invention to provide an improved magnetic system for floatingly supporting rotary elements by magnetic means, which is magnetically stable in the vertical direction, which reduces to a minimum the friction acting on the movable element, which is of rugged construction and which enables me to take advantage of the highly desirable qualities of permanent magnets composed of certain high coercive force magnetic materials.

It is a further object of my invention to provide a simple and improved magnetic stabilizer or centering means for the movable element of a watthour meter which is adapted to operate in conjunction with either a conventional mechanical end-thrust bearing or a magnetic suspension element and which is capable of withstanding the effects of relatively large temperature variations as well as demagnetizing surges acting on the operating element of the meter.

It is a still further object of my invention to provide a frictionless magnetic centering arrangement for maintaining the axis of a movable element in alignment with its normal axis of rotation.

Other objects and advantages of my invention will become apparent as the description proceeds.

The features of my invention which I believe to be novel and patentable will be pointed out in the appended claims. The invention may be better understood by reference to the following description when considered in connection with the accompanying drawing in which Figs. 1 and 2 are assembled views in elevation of the side and front respectively of an induction type integrating wattmeter with a portion of the cover cut away to show the relative arrangement of the parts; Fig. 3 is a detailed sectional elevation view of a magnetic stabilizer or centering system arranged in accordance with my invention and combined with a magnetic suspension and which is drawn to an enlarged scale to show more clearly the various parts; and Fig. 4 is a modification of the embodiment of the stabilizer illustrated in Fig. 3.

According to the preferred form of the invention for reducing to a minimum the friction on a rotatable element or shaft, I provide a single mechanical guide bearing for the shaft which cooperates with relatively spaced magnetic means of novel construction for guiding the shaft to a given axis of rotation. A conventional end-thrust bearing or a magnetic suspension may be employed in conjunction with the magnetic guide means for suspending the shaft. The magnetic suspension means when employed preferably comprises a stationary permanent magnet or flux producing means and a permanent magnet adapted to rotate with the shaft. The stationary magnet and the rotatable magnet are positioned in axial symmetry and arranged to produce a magnetic force for supporting the rotary element. The magnetic guide means comprises a pair of permanent magnets arranged in telescopic and coaxial relation with one of the magnets mounted to rotate with the shaft. The two magnets are magnetized in such a way that the interaction of their fields tends to center the shaft and, depending upon the relative position of the two magnets, the magnetic guide means may serve to partially balance the weight of the rotatable system or it may be made to oppose the magnetic or other suspension means.

Referring more particularly to Figs. 1 to 3 of the drawing, I have illustrated the magnetic centering or guide means of my invention in conjunction with a magnetic suspension system as applied to holding the rotary element of an induction type alternating current watthour meter in alignment and supporting the weight of the rotary element. It will be appreciated, however, that it may be employed in connection with other devices such as time-keeping elements, galvano-meters, and the like. The meter includes the usual base 10, a frame 12 which is secured to the base, and a cover element 14 for enclosing the operating parts of the meter. The meter also includes a vertical operating shaft 16 which is preferably composed of a suitable material or relatively light weight—as, for instance, aluminum, and mounted for rotation in a vertical plane by a lower side-thrust bearing or guide means 18 and an upper guide means or magnetic centering arrangement 20. The lower bearing assembly or guide means comprises an adjustably positioned annular side-thrust bearing member 21 and a pin type member 22 of small diameter. The bearing member 21 is secured in a recess 23 at the end of the spindle or shaft 16. The pin 22 passes through this annular member and is secured to a supporting member 24 which is adjustably mounted in a stationary bracket 26 formed at the bottom of the meter frame. The pin element 22 is constructed of small diameter so that the friction force about the side-thrust bearing element 21 is made to act at a small radius. The recess 23 may be filled with a lubricant where such operation is desired. Screw threads 28 carried by the support 24 and engaging a tapped hole provided in the member 26 provide means for adjusting the support 24 and the pin 22 up or down to the desired position. The supporting member 24 is clamped in position by means of a set screw 30 passing through an appropriately located tapped hole in the bracket member 26. The bearing member 21 may be composed of any suitable material—as, for instance, a resin impregnated fabric material sold under the registered trade-mark "Textolite," or other materials used to form the ordinary jewel bearings of a meter.

The upper side-thrust bearing assembly or guide means 20 comprises two permanent magnet elements 32 and 34 for magnetically centering the rotary element 16. In the illustrated embodiment these magnets are constructed of tubular form or in the form of short hollow cylinders preferably of substantially the same length and they are arranged in radially spaced telescopic relation to form an annular air gap with the axes of the cylinders positioned vertically and in alignment. In other words, the magnets are disposed normally in substantially concentric relation or in axial symmetry with one magnet surrounding the other. The hollow cylindrical magnet 34 conveniently may be pressed over the end of the shaft 16 or it may be secured thereto by cement or other suitable means. I wish to point out, however, that while it is preferred to position the fixed or supporting magnet externally of and in surrounding relation to the rotatable magnet because of the relative simplicity of the mounting and the ability to use a rotatable magnet of small diameter, the relative location of the fixed and rotatable magnets may be reversed so far as the principle of operation is concerned. It will be appreciated also that only one magnet need be hollow. The hollow cylindrical magnet 32 is secured by a press fit or by other means in a suitable non-magnetic shell-like member 36 which may be composed of a suitable current-conducting material such as copper or brass, or a non-conductor such as a plastic material. Screw threads 38 which are formed on a projecting portion 40 of the member 36 engage a threaded aperture 42 formed in a bracket member 44 which is positioned at the upper end of the meter frame 12. By rotating the member 40 the magnet 32 may be raised or lowered. A set screw 46 which passes through the bracket 44 provides means for locking the member 40 securely in position.

As indicated the magnets 32 and 34 are each magnetized in the direction of the longitudinal axes of their respective cylinders and in relatively opposite directions with respect to the shaft as an axis. The movable magnet 34 is positioned in such a manner that one of its poles, for example the north pole, is relatively close to the pole of like polarity of the rotatable magnet and relatively remote from the pole of unlike polarity of the rotatable magnet. The effective zone of the lower pole of the rotatable magnet floats above the so-called neutral zone of the fixed magnet or the plane at which the polarity of the latter magnet may be said to reverse in proceeding from one end of the magnet to the other. Thus, there is produced a lateral repulsion force between the upper pole of the rotatable magnet and the lower pole of the fixed magnet which tends to stabilize the rotatable magnet or to cause it to maintain a concentric position with respect to the fixed magnet. It may be observed that the two magnets also form a closed flux path so that a slight attractive force acting downward is produced by the interaction of the fields of the two magnets. Inasmuch as the poles of the outer magnet are radially displaced by a relatively large amount from the rotary axis with respect to the respective poles of the rotatable magnet with which they cooperate, the fixed magnet is always out of the path of the vertical axial movement of the rotatable magnet.

The foregoing centering arrangement may be employed in connection with an ordinary lower bearing assembly which serves both as a guide means and support for the rotary element, but in order to reduce the friction on the rotating element I prefer to employ in conjunction with the magnetic guide or centering means a magnetic suspension for supporting the rotary element 16, and the bearing assembly 18 for guiding the shaft. In the illustrated embodiment of Fig. 3, I have shown an assembly 50 comprising two permanent magnets 52 and 54 which are arranged in axial symmetry for magnetically suspending or supporting the rotary shaft 16. As indicated these magnets are of generally circular or cylindrical shape and are constructed in the form of an annular plate, or short cylinder, having openings 56 and 58 respectively extending along the longitudinal axis. The magnet 54 may be secured to the shaft 16 in a manner similar to that described in connection with the mounting of the rotatable magnet 34. The lower or fixed permanent magnet 52 is adapted to be secured in fixed relation as by a press fit to the shell-like supporting member 24. The magnets are polarized in relatively opposite directions as shown and are arranged so that the pole of one magnet confronts the like pole of the other magnet. The magnets being polarized axially or longitudinally of the apertured cylinders composing them and they being positioned about the same vertical axis their polar axes are likewise in vertical alignment. As already described the supporting member 24 may be adjusted to position the magnet 52 up or down with respect to the bracket member 26.

Attached to the shaft 16 is a current conducting disk 60 of a watthour meter which cooperates with the usual alternating current field producing elements (hidden from view) for producing rotation of the shaft 16 in accordance with the measured quantity. As is well understood, alternating current watthour meters which employ a single driving element, for example, include two alternating current magnets, one excited by the current and the other by the potential of the circuit in which the power is to be measured, each of which induces phase-displaced eddy currents in the meter disk. The disk is driven or caused to rotate by means of the reaction between the field of one magnet and the current induced in the disk by the other magnet of the same driving element. A pair of the usual damping magnets 62, 62, each having an air gap 64 formed between its poles and adapted to receive the disk 60, is provided for setting up a magnetic field to oppose the rotation of the disk in order to make its speed proportional to the power consumption measured by the meter. I wish to point out that while I have illustrated a watthour meter of the single-phase type employed in connection with my invention, I may likewise employ a meter of the polyphase construction in which the driving elements are made to operate on either one or a plurality of disks. A suitable registering mechanism, having an operating member 68 which is adapted to be operated from a worm gear 70 on the shaft 16 in accordance with the shaft rotation gives an indication of the energy measured over a period of time. If desired, a magnetic drive means may be employed for driving the registering mechanism. Where mechanical gears are employed a pinion gear instead of the worm gear element 70 may be found more suitable for driving the registering or other mechanism where appreciable torque is required for driving the registering or other mechanism to be operated by the shaft because with such an arrangement there is no tendency to cause the disk 60 to change its position in the air gaps 64. This is an important consideration from the standpoint of accuracy in measurement because of the fact that there is an uneven distribution of the flux produced by the damping magnets from the top to the bottom of the gaps.

In Fig. 4, I have shown a modified arrangement of the centering arrangement of Fig. 3 in which the rotatable magnet 34 is positioned with its upper pole adjacent the lower pole of like polarity of the fixed magnet 32. That is, the upper pole of the rotatable magnet is positioned below the neutral zone of the stationary magnet. As will be explained hereinafter, in this arrangement the centering arrangement 20' aids in supporting the disk and shaft whereas the centering device of Fig. 3 tends to oppose the suspension magnets.

It should be pointed out that other types of magnetic suspension elements may be employed in lieu of the illustrated arrangement in which the suspension magnets are arranged to produce a repulsion force. For example, these magnets may be replaced by a pair of concentrically positioned magnets in which the supporting force is predominantly one of magnetic attraction, as described and claimed in my application Serial No. 359,732, entitled "Magnetic suspension," filed concurrently herewith, and assigned to the General Electric Company, the assignee of the present invention.

My invention is not limited to the case where the magnetic centering means is positioned above the disk but obviously includes the arrangement where both the centering means and the suspension means are positioned either above or below the disk. Furthermore, the general arrangement of the magnetic guide means, the magnetic suspension means, and the side-thrust bearing element may be reversed so that the suspension means and the side-thrust bearing are positioned adjacent the top or at other points along the shaft and the magnetic centering means below the suspension means. In this latter variation, as well as the variation in which both magnetic means are located above the disk, the central aperture formed in the fixed suspension magnet would be made sufficiently large to permit the shaft to which the rotatable suspension magnet is secured to pass freely therethrough.

In operation, the parts are assembled as described and the fixed magnets 32 and 52 are arranged vertically by the adjusting mechanisms the desired amount to properly position the disk 60 in the gaps 64 of the damping magnets 62 as indicated in Figs. 1 and 2. As the disk is caused to rotate by the driving elements, the rotatable system including the two magnets 34 and 54, the shaft 16 and the disk 60 may be said to truly float upon the magnetization of the system since the rotating system is made entirely free from friction due to vertical components of force. Furthermore, the magnetic centering or guide arrangement in conjunction with the single side-thrust bearing element maintains the rotary element 16 centered about a given axis with a minimum amount of friction. In the arrangement of Fig. 3 there is a vertical component of attractive force exerted between the lower poles and between the upper poles of the two magnets which tend to pull the shaft 16 downward a slight amount in opposition to the magnetic repulsion force produced between the magnets 52 and 54. Thus, the magnets 52 and 54 must have sufficient force to overcome the dead weight of the system in addition to the vertical force exerted by the magnetic centering device.

In the arrangement of Fig. 4, the operation of the system is quite similar to that of Fig. 3 but inasmuch as the respective poles of the movable magnet 34, which coope be with the poles of unlike polarity of the fixed magnet 32, are positioned in such a way that there is a vertical component of force exerted in the upward direction, the magnetic centering device tends to aid the suspension magnets in supporting the weight of the rotatable elements thereby making is possible to use smaller supporting magnets than this required in the arrangement of Fig. 3. In either of the foregoing arrangements, while the rotating system may be deflected upward or downward by an abnormal disturbing force, it will again restore itself or find its own level of flotation and remain suspended in the air without mechanical end-thrust bearing supports when the abnormal disturbing forces are removed. The foregoing results from the fact that the repulsion force increases as the rotatable magnet is moved closer to the stationary magnet. As to the centering device, maximum lateral stability exists with maximum unbalance in vertical stability. Any tendency or force acting to decenter the rotatable magnet 34 is accompanied by an increasing magnetic repulsion force in a radial direction between the poles of the movable and fixed magnets of the magnetic guide means so that when the force is removed the rotatable magnet tends to center itself or assume a concentric position within the fixed magnet.

The arrangement of the magnets in axial symmetry so that both of the rotatable magnets rotate about their polar axes represents an important advantage from the standpoint of reducing hysteresis and eddy current effects to a minimum. With the magnets composed of homogeneous magnetic material and uniformly magnetized there will be no change in magnetic potential between the stationary and rotatable magnets so that hysteresis and eddy current effects are avoided. Such effects when present produce starting difficulties, as well as retarding torques on the rotatable element during operation, and they reduce the efficiency of the magnetic system.

With either of the magnetic centering arrangements of Figs. 3 and 4 operating alone for obtaining lateral stability, it will be appreciated that vertical stability at the same time is unattainable. That is, the magnetic centering means cannot at the same time function as a suspension system. However, when the magnetic centering means is arranged as in Fig. 4 so that the unbalanced vertical force is in such a direction as to support part of the weight of the moving system, it may be employed to advantage with a moving system mounted on either a pivot or ball type bearing which guides and supports the shaft or with a magnetic suspension system and guide bearing as shown in Fig. 3. When the magnetic centering device is constructed as in Fig. 3, however, the effective weight of the moving system is increased so that it is desirable with such an arrangement to employ at all times a magnetic suspension in conjunction with the centering device.

When the magnetic centering device is used with an ordinary pivot type load supporting and guide bearing, for example, and when it is constructed to have vertical unbalance of the centering device in a direction to carry part of the load of the moving system, it offers a marked advantage over the conventional type upper guide bearing because it eliminates the upper bearing friction, and, by relieving some of the load from the pivot, the wear on the pivot is decreased with the result that it is possible to use a pivot of smaller dimensions, thereby decreasing the friction force. When the centering device is employed with a magnetic suspension there is the added advantage of reducing the friction still more as well as maintenance costs.

Owing to the limited space available, the savings made possible by and the advantages of using a standard meter frame, the peculiar conditions encountered in the operation of watthour meters, and other factors which will appear hereinafter, it is important to utilize a material for the permanent magnets 32, 34, 52 and 54 which has a relatively high coercive force and which is relatively insensitive to the temperature variations likely to be encountered. My invention in its broad aspect is, of course, not restricted to the use of any particular material but I prefer to employ a magnetic material having a coercive force of at least 800 oersteds and a residual induction of at least 1000 gausses. I have found that an alloy comprising as essential ingredients copper, nickel, and cobalt is highly satisfactory for carrying out the principles of my invention. Such alloys have been produced having coercive forces ranging from approximately 100 to 950 oersteds and residual inductions ranging from above 1000 to approximately 8000 gausses. A suitable composition for the permanent magnets which I have constructed and tested is approximately 60% copper, 20% nickel, and 20% cobalt. Such a composition has a coercive force of approximately 950 oersteds and a residual induction of about 2100 gausses. However, a wide variation in percentages is permissible, such for example as 50% copper, 25% nickel, and 25% cobalt, and other combinations of copper-nickel-cobalt with one or more other constituents, as will be seen from an inspection of the United States Patent No. 2,170,047 to Walter Dannohl and Hans Newmann. Magnets composed of this material when properly treated or "aged" before being inserted in the meter are highly resistant to temperature influences. Alloys of the foregoing character need not be given their final form by casting because they may be machined readily to the desired dimensions. This adaptability for machining by the use of drills and other cutting tools as distinguished from a grinding operation is a great advantage particularly in the application described from the standpoint of convenience and savings in time and expense since the magnets must have internal openings or apertures formed therein of very small diameter.

The ordinary watthour meter may be subjected to temperature variations ranging from as low as 60 degrees below zero centigrade to 100 degrees above zero centigrade. There are several other important effects in connection with the operation of watthour meters which tend to interfere with the magnets used in suspending the rotary element. As is well known there is an inherent tendency in permanent magnets to "age" or gradually weaken over a period of time. The magnets also tend to weaken due to magnetic disturbances and the effects of temperature variations. Meters installed under practical conditions on electric supply lines to serve central station customers are likely to be subjected to two classes of magnetic disturbances. In the first of these, a short circuit occurs on the load side of the meter (that is, on the customers' side) which may cause a transient current of from one hundred to even one thousand or more times the rated current of the meter to flow through the current coil or coils before the fuses or breakers can interrupt the circuit (depending upon the short circuit capacity of the supply system and the severity of the short circuit). In the second of these classes of magnetic disturbances, the meter is subjected to a transient over-voltage or current of very short duration, usually because of a surge caused by lightning. These lightning surges may be of all magnitudes up to a value sufficient to burn up the meter or break down the insulation, but many such surges are insufficient to do this and dissipate themselves by causing abnormally large transitory currents in the potential coil of the meter. When either one or a combination of the above two classes of abnormal surges occur, strong magnetic fields are set up around the meter coils and their core structures may become completely saturated, causing strong leakage fields. These transient fields may be of the order of hundreds or even thousands of times the normal value of the leakage fields to which the magnets are ordinarily subjected and, since they are usually produced by alternating current, they are highly demagnetizing in character.

In my apparatus, however, owing to the properties of the material of which the permanent magnets are composed and the fact that they are subjected to an alternating current "knockdown" previous to their insertion in the meter, they retain their magnetism with great constancy and watthour meters utilizing my improved magnetic centering or stabilizing means and suspension will retain their high degree of efficiency practically indefinitely. This alternating current "knockdown," which is deliberately given to the magnets by subjecting them to a certain number of demagnetizing ampere-turns, makes them much more highly resistant to surges so that the above is true even though a very heavy abnormal field should be produced in the vicinity of the magnets. The knockdown ampere-turns per unit of length provide a measure to a very large extent of the degree of immunity of a given magnet to demagnetizing influences such as surges of the aforementioned character. Magnetic shielding means has been employed heretofore to aid in protecting magnets from the demagnetizing effects of surges but such means only partially guards against such effects since it is almost impossible to guard completely against a magnetomotive force by a magnetic shield.

Because of the ability to make use of the "knockdown" principle to the necessary degree with the high coercive force materials which I have employed, it has been found unnecessary to employ either a magnetic or a current-conducting shielding means in connection with my magnetic centering device. In certain cases, however, as for instance when extreme compactness is required so that it becomes necessary to position the stabilizing magnets close to the operating coils of the meter, it may be found desirable to employ a current conducting shield or a magnetic shield or both as shown in Figs. 3 and 4 of the drawing. I have shown a shield 74 composed of a suitable high permeability magnetic material such as soft iron or annealed cold steel, for example, which is adapted to surround the magnets 32 and 34. The surface of each magnet is shown coated or covered with a shield 76 composed of a suitable current-conducting material such, for example, as copper plating. The member 36 may also be composed of a current-conducting material.

I have also shown a magnetic shielding element 78 positioned about the magnets 52 and 54 which is similar to the shield 74. The magnets are also provided with a current-conducting shield.

These current-conducting shields protect the magnets to some extent from high frequency surges and steep wave fronts, such as those due to lightning and switching on systems. The magnetic shield gives some protection to the magnets from the effects of steady or uniform external fields including those of low frequency. In addition, and particularly so with respect to the magnetic suspension magnets, the magnetic shield tends to neutralize any unsymmetry of magnetization in the magnets themselves caused by defective magnetization, unhomogeneous material, or unsymmetrical "knockdown" due to contact with magnetic material during assembly. Further, the magnetic shield tends to reduce any vibration of the moving element which might be caused in some cases, due to the interaction between the alternating field of the meter element and the floating magnets.

Watthour meters employing my improved magnetic centering means and a magnetic suspension system and having magnets composed of copper-nickel-cobalt alloy of the relative proportions indicated, have been tested in soundproof test rooms and their operation compared with that of standard ball and pivot bearing meters. With loads ranging from 200 to 400% of normal loads, the ball and pivot bearing type meter was found to chatter or make a noise which is excited by the guide part of the lower bearing and resonated by the disk due to the ball sliding up and down the radius of the jewel cup. On the other hand, the watthour meters employing the magnetic guide means and suspension system according to my invention were found to be quiet in operation up to 600% of normal load. Furthermore, during the operation of the meters employing ball and pivot bearings at heavy loads, as the ball tends to crawl up the side of the lower bearing it changes the position of the disk in the air gap of the damping magnets. As pointed out hereinbefore, this movement tends to interfere with the calibration of the meter. It will be appreciated that the system employed for driving the disk preferably will be one whereby side-thrust is maintained at a minimum. I have also found from tests conducted on the aforementioned meters that the disk retains substantially the same position in the air gaps of the damping magnets throughout the wide temperature range referred to hereinbefore.

I have thus provided an improved magnetic system comprising a magnetic guide means and a magnetic suspension which operates successfully to satisfy the exacting requirements of watthour meters even when subjected to the many deleterious influences which such meters are likely to encounter at times during their operation. It is adapted to be employed to great advantage in connection with the rotary elements of measuring devices of various character where the reduction of friction is important and where vibration and shock are likely to be encountered.

In the drawing, I have illustrated tubular magnets of hollow cylindrical shape employed in the magnetic guide means; however, my invention is not limited to such an arrangement but obviously includes the arrangement in which either the internal surface of the outer tubular magnet or the outer surface of the internal magnet which forms the boundary for the air gap between the magnets is made similar to the surface of a polyangular prism instead of constructing both of these surfaces of cylindrical shape. It may be pointed out also that the inner magnet may be a solid member if desired, irrespective of whether this magnet be the rotatable or stationary one. It should be further understood that while I have shown the magnetic centering device arranged at the upper end of the shaft and on the opposite side of the disk from the magnetic suspension means, the arrangement may be altered to suit given situations. The present arrangement permits an economical utilization of the available space and at the same time permits the magnets to be spaced as far as possible from the driving elements.

In accordance with the provisions of the patent statutes, I have described the principle of operation of my invention together with the apparatus which I now consider to represent the best embodiments thereof but I desire to have it understood that the apparatus shown is merely illustrative and the invention may be carried out by other means.

What I claim as new and desire to secure by Letters Patent in the United States is:

1. In combination, a member to be mounted for rotation about a vertical axis, first and second means arranged in spaced relation along said axis for guiding the rotation of said member, one of said guide means comprising a pair of permanent magnets constructed in the form of cylinders, each of said cylinders being magnetized along its longitudinal axis to form poles of opposite polarity at the ends thereof, the first of said cylinders being constructed with a longitudinal axial opening extending therethrough, said opening being of sufficient size to form an air gap between said cylinders when the second of said cylinders is positioned in said opening, means for supporting one of said cylinders with its longitudinal axis substantially in alignment with the normal axis of rotation of said rotatable member, means for securing the other of said magnets in fixed relation to said rotatable member with its longitudinal axis in alignment with the rotary axis of said member, said second magnet being positioned partially within the longitudinal opening formed in said first magnet, and said rotatable magnet being further arranged on said member with its polar axis relatively opposite in direction to that of said supported magnet and with one of its poles in close proximity to the pole of like polarity of said supported magnet, whereby a radial repulsion force is exerted between said magnets tending to center the rotation of said member about a single axis.

2. In combination, a member adapted for rotation about a vertical axis, first and second means arranged in spaced relation along said axis for guiding the rotation of said member, one of said guide means comprising a pair of permanent magnets of cylindrical form, the first of said cylinders having a longitudinal axial opening extending therethrough of greater diameter than the second of said cylinders, each of said cylinders being magnetized along its longitudinal axis to form poles of opposite polarity at the ends thereof, means for supporting one of said cylinders with its longitudinal axis substantially in alignment with the normal axis of rotation of said rotatable member, means for securing the other of said cylinders in fixed relation to said rotatable member with its longitudinal axis in alignment with the rotary axis of said member and with its polar axis relatively opposite in direction to that of said supported cylinder, said rotatable cylinder being positioned in telescopic relation with the other cylinder with one of its poles adjacent a pole of the same polarity of said other cylinder, whereby a radial repulsion force is exerted between said magnets for producing a centering action on said member tending to cause rotation thereof about a single axis, said rotatable cylinder being further arranged with its neutral axis of polarity below the neutral axis of polarity of said supported magnet whereby a vertical component of magnetic force is exerted on said rotatable cylinder in the upward direction for supporting a portion of the vertical load due to said rotatable member, and means for supporting the remainder of said load.

3. In combination, a member adapted for angular movement about a vertical axis, a side-thrust bearing for guiding said movable member, magnetic means positioned in relatively spaced relation to said bearing, said magnetic means comprising a pair of permanent magnets, one of said magnets being stationary, the other of said magnets being mounted for movement with said movable member, said magnets being arranged to occupy a position of axial symmetry with respect to each other when the axis of angular movement of said member is in alignment with said vertical axis, said magnets being further constructed and arranged to provide a radial magnetic force for counterbalancing unbalancing influences on said member to stabilize the angular movement thereof about said axis, and means for supporting said movable member.

4. In combination, a member adapted for rotation about a vertical axis, a side-thrust bearing for said rotatable member, magnetic means comprising a pair of permanent magnets acting in conjunction with and vertically spaced from said bearing for maintaining said rotatable member substantially in alignment with such vertical axis of rotation, one of said magnets being mounted in fixed relation and the other of said magnets being mounted for rotation with said rotatable member, said magnets being further arranged in axial symmetry with their polar axes substantially parallel to the axis of rotation, and additional magnetic means producing an upward force for supporting said rotatable member.

5. In combination, a member adapted for rotation about a vertical axis, a side-thrust bearing for said rotatable member, magnetic means comprising a pair of permanent magnets disposed in relatively spaced relation to said bearing and acting in conjunction therewith for counteracting the effects of unbalanced influences on said movable element, said magnets being disposed in axial symmetry and in telescopic relation with respect to each other, one of said magnets being mounted in fixed relation and the other of said magnets being mounted in coaxial relation to rotate with said rotatable member, said magnets being polarized in a direction parallel to the axis of rotation and in relatively opposite directions, said magnets being further arranged so that radial magnetic forces are produced on said rotatable magnets tending to maintain the same in alignment with its normal axis of rotation, and a second pair of permanent magnets disposed in axial symmetry for supporting said rotatable member, one of said magnets being mounted in fixed relation with its axis in line with the axis of rotation and the other of said magnets being mounted for rotation with said rotatable member, said magnets being magnetized in a direction parallel to the axis of rotation and in relatively opposite directions, and said magnets being arranged to produce an upward force on the rotatable member due to the interaction of their magnetic fields.

6. In a magnetic system, a guide bearing, a first permanent magnet means circularly arranged about a vertical axis passing through said guide bearing, means rotatable about said vertical axis and guided by said bearing, a second permanent magnet means circularly arranged about said rotatable means and fixed thereto in a position above said first permanent magnet means, one of said permanent magnet means having one pole thereof confronted by a like pole of the other of said permanent magnet means in all positions of rotation of said rotatable means whereby a magnetic force of repulsion is produced between said first and second magnet means for floatingly supporting said rotatable means and said second permanent magnet means, and magnetic means acting in conjunction with said guide bearing for stabilizing the operation of said rotatable means about a vertical axis, said magnetic means comprising a pair of cylindrical magnets arranged in telescopic relation with the axes thereof normally substantially in alignment with the axis of said rotatable means, said magnets being polarized in a direction parallel to the axis of said rotatable means and the polarities of said magnets being relatively opposite, one of said magnets being mounted for rotation on said rotatable means in such a position with respect to the other magnet that a radial magnetic force of repulsion is exerted between said magnets tending to maintain said rotatable means in alignment with a single axis of rotation.

7. In combination, a shaft member to be mounted for angular movement about a vertical axis, a single mechanical guide bearing, magnetic means cooperating with said guide bearing for counteracting unbalancing influences on said shaft to maintain the axis thereof substantially in alignment with its normal axis of rotation, said magnetic means comprising a pair of permanent magnet elements arranged in concentric relation, one of said magnet elements being stationary and the other of said magnet elements being mounted for movement with said shaft member, said magnet elements being magnetized in the direction of the axis of rotation and in relatively opposite directions, and said magnet elements being relatively displaced in an axial direction to produce a magnetic force due to the interaction of the fields of said magnets having a component tending to stabilize said shaft in a lateral direction and a vertical component for partially supporting the weight of the shaft member, and means for supporting the balance of said weight.

8. In combination, means comprising a shaft member to be mounted for rotation about a vertical axis, a single mechanical guide means, magnetic means spaced from and acting in conjunction with said guide means for maintaining the axis of said shaft member in alignment with its normal axis of rotation, said magnetic means comprising a pair of permanent magnets arranged in telescopic relation, one of said magnets being fixedly mounted and the other of said magnets being arranged to rotate coaxially with said shaft member, said magnets being magnetized in opposite senses in the direction of the axis of rotation, said magnets being further arranged with their respective poles displaced along said axis in such a way that an interaction between the fields of said magnets takes place producing a radial force tending to provide a lateral stabilizing action on said rotatable magnet and a vertical force for partially supporting the weight of said rotatable means, and magnetic means comprising permanent magnets mounted in axial symmetry for supporting the remainder of the weight of said rotatable means.

9. In a magnetic system, means comprising a shaft element to be rotated about a vertical axis, means for supporting said rotatable element and said means constituting the sole direct mechanical guide for said rotatable element, magnetic means acting in conjunction with and spaced from said last mentioned means for counteracting unbalancing influences on said rotatable element in order to stabilize the rotary operation thereof about a single axis, said magnetic means comprising a pair of permanent magnets, at least one of said magnets being constructed in the form of a hollow cylinder, said magnets being arranged telescopically and in radially spaced relation with respect to each other, means securing the first of said magnets on said shaft element for rotation therewith, means for supporting the second of said magnets, said magnets being magnetized in the direction of the normal axis of rotation and in relatively opposite directions, and said magnets being further arranged with their neutral axes axially spaced and with a pole of one magnet in close proximity to a pole of the same polarity of the other magnet to provide a radial centering force on said rotatable magnet due to the interaction of said magnets, shielding means of current conducting material associated with said magnets, and shielding means of magnetic material arranged adjacent and in surrounding relation with said magnets.

10. In a magnetic system, means comprising a shaft element to be rotated about a vertical axis, means for supporting said rotatable means and said means constituting the sole direct mechanical guide for said rotatable means, magnetic means acting in conjunction with and spaced from said last mentioned means for counteracting unbalancing influences on said rotatable means in order to stabilize the rotary operation thereof about a single axis, said magnetic means comprising a pair of cylindrical permanent magnets, at least one of said magnets being constructed as a tubular member, said magnets being arranged telescopically with their longitudinal axes substantially in the vertical position and said magnets being arranged in radially spaced relation with respect to each other, means securing the first of said magnets on said shaft element for rotation therewith with the longitudinal axis of said magnet coincident with the axis of the shaft, means for supporting the second of said magnets, said magnets being longitudinally magnetized in relatively opposite directions with respect to the shaft as an axis, and said magnets being further arranged with their neutral axes axially spaced and with a pole of one magnet in close proximity to a pole of the same polarity of the other magnet to provide a radial centering force on said rotatable magnet due to the intersection of said magnets.

11. In a system of the class described for a watthour meter of the type having a shaft rotatable about a vertical axis, a current conducting disk mounted on said shaft, and permanent magnet damping means for controlling the rotation of said disk, said system comprising, means for supporting said shaft, a single mechanical guide means for said shaft, magnetic means cooperating with and spaced from said mechanical guide means for counteracting unbalancing influences on said rotatable shaft in order to stabilize the rotary motion thereof about a single axis, said magnetic means comprising a pair of cylindrical members, one of said members being tubular and having a larger internal diameter than the external diameter of the other cylinder, each cylinder being longitudinally magnetized and said cylinders being arranged telescopically and in coaxial relation when in the normal position with their polar axes in relatively opposite directions, one of said cylinders being supported from a fixed member and the other of said cylinders being secured to said shaft with its longitudinal axis coaxial with said shaft, said cylinders being further arranged with one pole of one magnet in close proximity to a like pole of the other magnet, whereby a radial repulsion centering force and a vertical component of attractive force are produced on said shaft, said cylinders being composed of a machinable alloy comprising as essential ingredients 45–60%, 20–30% nickel, and 20–30% cobalt and said alloy having such a temperature-flux characteristic that the position of said disk in the field of said damping magnets is substantially unaffected by temperature variations in the vicinity of said magnets within the temperature range encountered in the operation of said watt-hour meter.

ALBERT HANSEN, Jr.